Oct. 17, 1950  N. N. SPIER ET AL  2,525,970
PROCESS AND APPARATUS FOR MANUFACTURE OF SHELLAC
Filed March 3, 1947  2 Sheets-Sheet 1
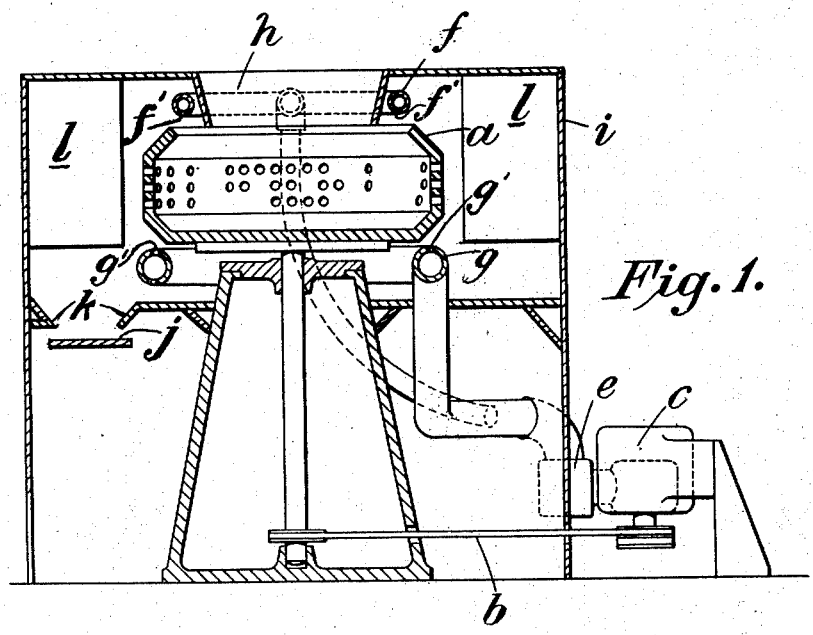
Fig. 1.
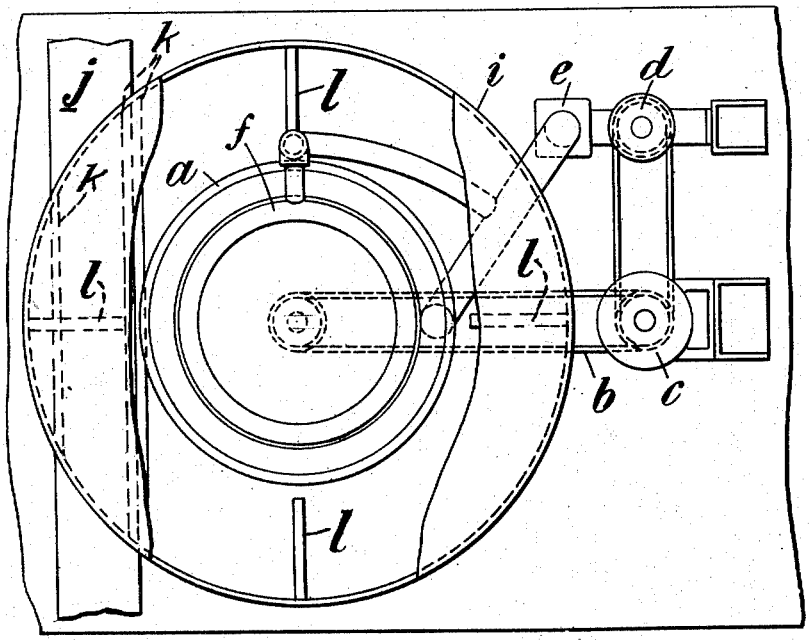
Fig. 2.  Inventors
N. N. Spier
E. Phillips
By Mason K Downing Hubert Attys Oct. 17, 1950 N. N. SPIER ET AL 2,525,970
PROCESS AND APPARATUS FOR MANUFACTURE OF SHELLAC
Filed March 3, 1947 2 Sheets-Sheet 2

Inventors
N. N. Spier
E. Phillips

Patented Oct. 17, 1950

2,525,970

UNITED STATES PATENT OFFICE 2,525,970

PROCESS AND APPARATUS FOR MANUFACTURE OF SHELLAC

Norman Nathan Spier and Emanuel Phillips, Manchester, England, assignors to Locke, Spier & Company (1928) Limited, Manchester, England, a British company Application March 3, 1947, Serial No. 732,102 In Great Britain January 23, 1946

Section 1, Public Law 690, August 8, 1946 Patent expires January 23, 1966

9 Claims. (Cl. 18—12)

This invention relates to improvements in the manufacture of bleached and unbleached shellac and to the products obtained thereby. Bleached and unbleached shellacs (dewaxed and otherwise) are usually produced in hanks or flats obtained by twisting or wringing the shellac by hand or by passing it between rollers while in a plastic state after its treatment with hot or boiling water and such hanks must afterwards be chilled for a considerable time in cold water prior to being ground or broken up, before the shellac can be dried and/or dissolved in methylated spirits or other suitable solvent for use in the manufacture of lacquer varnishes or the like, or before it can conveniently be dissolved in alkaline aqueous media for use in the hat felt and related industries.

The hanks or flats so formed contain a large and variable proportion of moisture in the free state and are difficult to break up, and when broken it is necessary to remove at least a proportion of the free moisture before dissolving in methylated spirits or other solvents, otherwise a varnish or lacquer of poor quality is obtained and one with limited compatibility with other lacquer and varnish components. Ground or powdered shellac is usually dried in a drying cabinet, in a vacuum dryer, or other convenient drying apparatus after grinding.

The object of the present invention is to produce bleached and unbleached shellac either containing its normal proportion of shellac wax or a reduced proportion thereof, or no wax at all, in a form which contains considerably less moisture than is contained by the usual hanks or flats, and in a form suitable and convenient for immediate dissolution in methylated spirits or other medium without the necessity of being further broken up, and which possesses enhanced keeping properties.

According to the invention the shellac in the plastic state resulting from its treatment with hot or boiling water is extruded into a fine, shredded or thread like form by means of an extrusion apparatus which is maintained at a raised temperature. The extruded shellac cools and becomes brittle almost immediately and a large part of its moisture content evaporates, due to the fineness of the extruded material.

We may extrude the shellac by means of an extrusion press having a container for the shellac, a perforated die plate, and means for heating the container and die plate, e. g. a steam coil surrounding the lower part of the container.

Alternatively, we may extrude the shellac from a centrifuge bowl, means being provided for heating the bowl and the shellac contained therein.

By our invention finely divided shellac is produced quickly and efficiently in a dry state or with controlled predetermined moisture content.

Referring to the accompanying explanatory drawings:

Figure 1 is a diagrammatic elevation of a centrifuge arrangement for carrying out the method according to the invention.

Figure 2 is a plan view.

Figure 3:
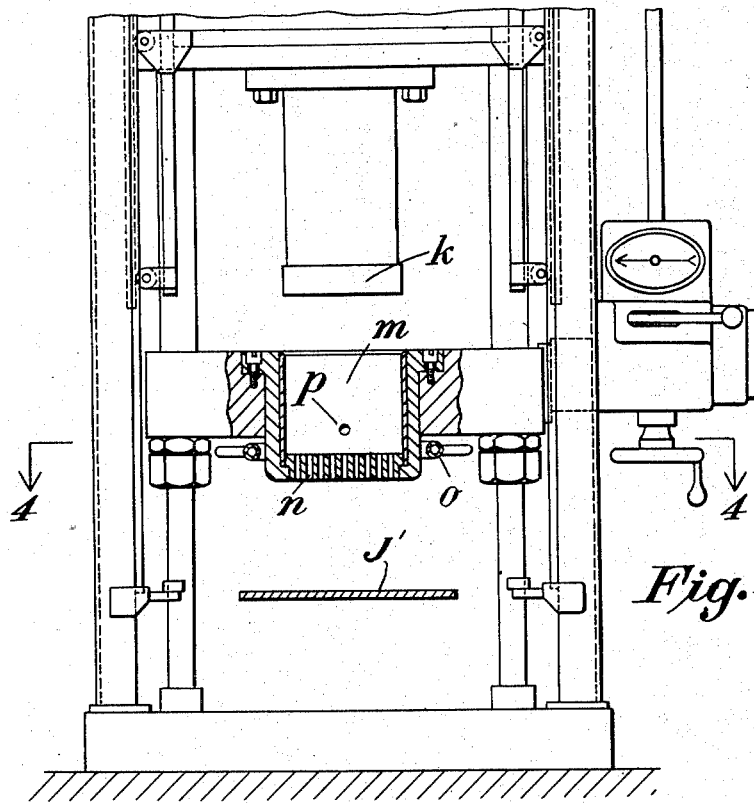
Figure 3 is a diagrammatic elevation of part of an extrusion press for carrying out the method according to the invention.
Figure 4:
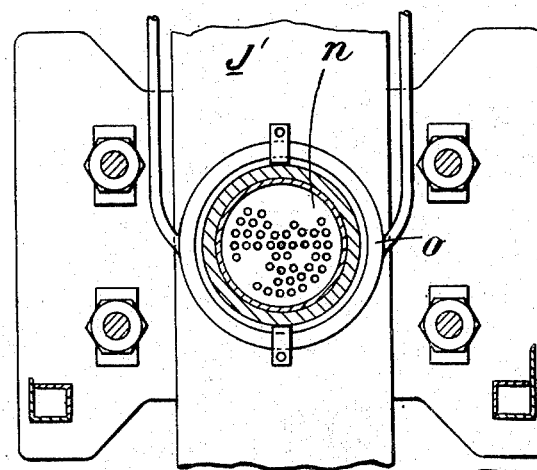
Figure 4 is a section on the line 4—4 in Figure 3.

In Figures 1 and 2, $a$ is a centrifuge bowl which is driven by a belt $b$ from a motor $c$. A fan $d$, also driven by the motor $c$, delivers air through a heater $e$ to two air distributing pipes $f$, $g$ of which one is located above the bowl $a$ and projects jets of hot air on to the contents of the bowl, and the other is located below the bowl and projects air upwards against the bowl through apertures $f'$ and $g'$, respectively.

The vertical side walls of the bowl $a$ have numerous small holes and shellac introduced in a plastic state through a hopper $h$, and heated by the hot air from the pipe $f$ is expelled through the holes in the form of fine rods which break off on account of their own weight and fall on to a conveyor belt $j$ located beneath the apparatus shown in the drawing. The air issuing from the lower pipe $g$ maintains the walls of the bowl $a$ in the necessary heated state and also flows past the finely divided shellac issuing from the holes and removes moisture therefrom.

If desired projections $l$ may be arranged on the inside of the casing $i$ around the centrifuge bowl, to catch the ends of the threads of shellac which are expelled horizontally as the bowl rotates, in order to assist in breaking them off. The broken threads may be guided by guide plates $k$ to the conveyor $j$. The air heater $e$ should be thermostatically controlled, as the bowl must be adequately heated or the plastic mass will become cooled, due to the high heat losses, to a point at which no extrusion will take place, and at the same time charring due to overheating must be avoided. The bowl and its contents should be kept at a temperature of about 105° C.

Figure 3 shows the essential parts of an extrusion press for extruding shellac threads. The press has a ram $k$, a container $m$ and a die plate $n$ having small perforations. Around the container in the vicinity of the die plate is a steam heating pipe o for maintaining the temperature of the material at about 105° C. A thermometer is fitted in the container at p. In other respects the press is of normal construction. A belt or other conveyor illustrated diametrically at j' is arranged to receive the threads falling from the die plate.

The centrifuge or press is preferably arranged at an elevation above the conveyor so that the shellac threads or rods fall freely for some distance before being caught on the conveyor.

Having now particularly described and ascertained the nature of our said invention and in what manner the same is to be performed, we declare that what we claim is:

1. In the manufacture of shellac, obtaining the shellac in a readily soluble form with a low moisture content, by extruding the shellac, while in a plastic state resulting from its treatment with hot or boiling water, into a fine, shredded or thread-like form, by means of an extrusion apparatus which is maintained at a raised temperature.

2. In the manufacture of shellac as claimed in claim 1, allowing the extruded threads to fall freely through the air on to a conveyor belt.

3. Apparatus for obtaining shellac in a finely divided form with a low moisture content, comprising a centrifuge bowl having fine perforations in its side walls, in which shellac in a plastic state is placed, means for rotating the bowl at a high speed, a hot air pipe under the bowl and having holes for directing jets of hot air against the peripheral part of the bowl, a hot air pipe above the bowl and having holes for directing jets of hot air on to the shellac in the bowl, a blower an air heater for supplying hot air to the hot air pipes and a casing around the centrifuge bowl having projections extending inwardly thereof and adapted to catch the ends of the threads of shellac which are expelled horizontally as the bowl rotates and assist in breaking them off.

4. A process for obtaining shellac in a readily soluble form with a low moisture content, comprising heating the shellac to bring it into a plastic state, introducing it into an extrusion apparatus a part of which has apertures therein, heating the said part of the apparatus and extruding the plastic shellac into a fine thread-like form.

5. A process for obtaining shellac in a readily soluble form with a low moisture content, comprising heating the shellac to bring it into a plastic state, introducing it into a centrifuge bowl having extrusion apertures around its periphery, heating the shellac in the bowl, separately heating the periphery of the bowl while simultaneously rotating the bowl to extrude the plastic shellac into a fine thread-like form.

6. A process for obtaining shellac in a readily soluble form with a low moisture content, comprising heating the shellac to bring it into a plastic state, introducing it into a centrifuge bowl having extrusion apertures around its periphery, separately blowing hot air of sufficient temperature against the peripheral part of the bowl from below and onto the shellac in the bowl from above, to heat the bowl and the shellac to a temperature of about 105° C., and rotating the bowl while maintaining that temperature, to extrude the plastic shellac into a fine thread-like form.

7. A process for obtaining shellac in a readily soluble form with a low moisture content comprising heating the shellac to bring it into a plastic state, introducing the same into an apertured centrifuge, and rotating the centrifuge while separately applying heat to the shellac therein and to the periphery of the centrifuge to extrude the plastic shellac into fine threads and directing heat past the extruded threads to remove moisture therefrom.

8. Apparatus for obtaining shellac in a finely divided form with a low moisture content, comprising a centrifuge bowl having fine perforations in its side walls, in which shellac in a plastic state is placed, means for rotating the bowl at a high speed, a hot air pipe under the bowl and having holes for directing jets of hot air against the peripheral part of the bowl, a hot air pipe above the bowl and having holes for directing jets of hot air on to the shellac in the bowl, a blower and an air heater for supplying hot air to the hot air pipes and the said bowl being disposed vertically, and including side walls having a vertical portion having the said perforations therein and an angular portion below said vertical portion, the bottom of the bowl having less diameter than the said vertical portion so that the angular portion extends outwardly and upwardly, the said hot air pipe below the bowl being subjacent the angular portion so that the hot air issuing therefrom is deflected by the said angular portion to flow past the finely divided shellac issuing from the aperture.

9. Apparatus as defined in and by claim 8, wherein collecting means are provided below the bowl to receive the extruded threads.

NORMAN NATHAN SPIER.
EMANUEL PHILLIPS.

REFERENCES CITED

The following references are of record in the file of this patent:

UNITED STATES PATENTS

| Number | Name | Date |
|---|---|---|
| 884,571 | Cowing | Apr. 14, 1908 |
| 1,093,451 | McRonald et al. | Apr. 14, 1914 |
| 1,352,623 | Perry | Sept. 14, 1920 |
| 2,017,150 | Haunz | Oct. 15, 1935 |
| 2,152,423 | Von Reis | Mar. 28, 1939 |